United States Patent [15] 3,644,668

Reeber [45] Feb. 22, 1972

[54] GATED VIDEO INVERTER

[72] Inventor: Nicholas J. Reeber, Hauppauge, N.Y.

[73] Assignee: Hazeltine Corporation

[22] Filed: Sept. 25, 1969

[21] Appl. No.: 860,896

[52] U.S. Cl. ..........178/7.1, 178/DIG. 6

[51] Int. Cl. ..........H04n 5/22

[58] Field of Search ..........178/6 F, 6 M, 7.1 R, 7.2 R, 178/6.6 A, 6.7 A, 7.1, 7.2, DIG. 6; 307/218

[56] References Cited

UNITED STATES PATENTS

| | | | |
|---|---|---|---|
| 2,827,566 | 3/1958 | Lubkin | 307/218 |
| 2,949,500 | 8/1960 | Shepard | 178/7.2 |

*Primary Examiner*—Robert L. Griffin
*Assistant Examiner*—George G. Stellar
*Attorney*—Kenneth P. Robinson

[57] ABSTRACT

Disclosed is a gated video inverter which inverts only the image polarity of an image representative video signal consisting of alternating video and blanking components occurring during respective video and blanking intervals. The inverter utilizes a diode combining circuit for combining a supplied video signal and a gate signal to develop a composite video signal having the character of the supplied video signal during the video interval and the character of the gate signal during the blanking interval. The composite video signal is then inverted to produce an output video signal having the desired inverted image polarity and an uninverted blanking component.

5 Claims, 6 Drawing Figures

GATED VIDEO INVERTER

BACKGROUND OF THE INVENTION

This invention relates to video signal inverters and more particularly to a novel inverter which is capable of inverting a selected portion of a video signal.

Image representative video signals consisting of alternating video and blanking components, occurring during respective video and blanking intervals, can be inverted by applying them to an appropriately biased amplifier which is arranged to provide an output video signal having a polarity continuously opposite of the applied input video signal. However, the resultant output signal has both an inverted image polarity and an inverted blanking polarity. Inversion of the blanking polarity is an undesirable characteristic in video systems where the blanking component is used as a reference level representative of the minimum value of the video component regardless of the image polarity of that component. For example in a system where a video signal passes through successive stages which are AC coupled, the blanking component may be used to establish a DC reference level for the video signal in each stage. This would not be possible if inverting stages in the system shifted the blanking component of the signal to an undesirable level.

It is therefore an object of the invention to provide a video signal inverter capable of inverting only the image polarity of an image representative video signal.

It is a further object of the invention to provide a video signal inverter capable of developing an output video signal having an inverted image polarity and a blanking component established at a predetermined reference level which is equal to or less than the minimum possible value of the video component of the output signal.

It is a still further object of the invention to provide a video signal inverter which provides an inverted and/or an uninverted output video signal.

It is a still further object of the invention to provide a video signal inverter capable of establishing the blanking component of a video signal at a reference level without affecting the DC level of the video component of the video signal.

In accordance with the invention an apparatus for inverting only the image polarity of an image representative video signal having alternating video and blanking components occurring during respective video and blanking intervals includes means for supplying the video signal with at least a portion of each blanking component occurring at a reference level. Also included are means for supplying a gate signal having a predetermined amplitude and occurring during at least a portion of each blanking interval. Further included are means for combining the video and the gate signals to develop a composite video signal having the character of the supplied video signal during the video interval and having the character of the gate signal during the portion of the blanking interval in which the gate signal occurs. Finally included are means for inverting the composite video signal to develop an output video signal, having a video component with inverted image polarity and having a blanking component with uninverted blanking polarity portions provided by inverted gate signals.

For a better understanding of the present invention, together with other and further objects thereof, reference is had to the following description taken in connection with the accompanying drawings and its scope will be pointed out in the appended claims.

DESCRIPTION OF THE APPARATUS OF FIG. 1

Figure 1:
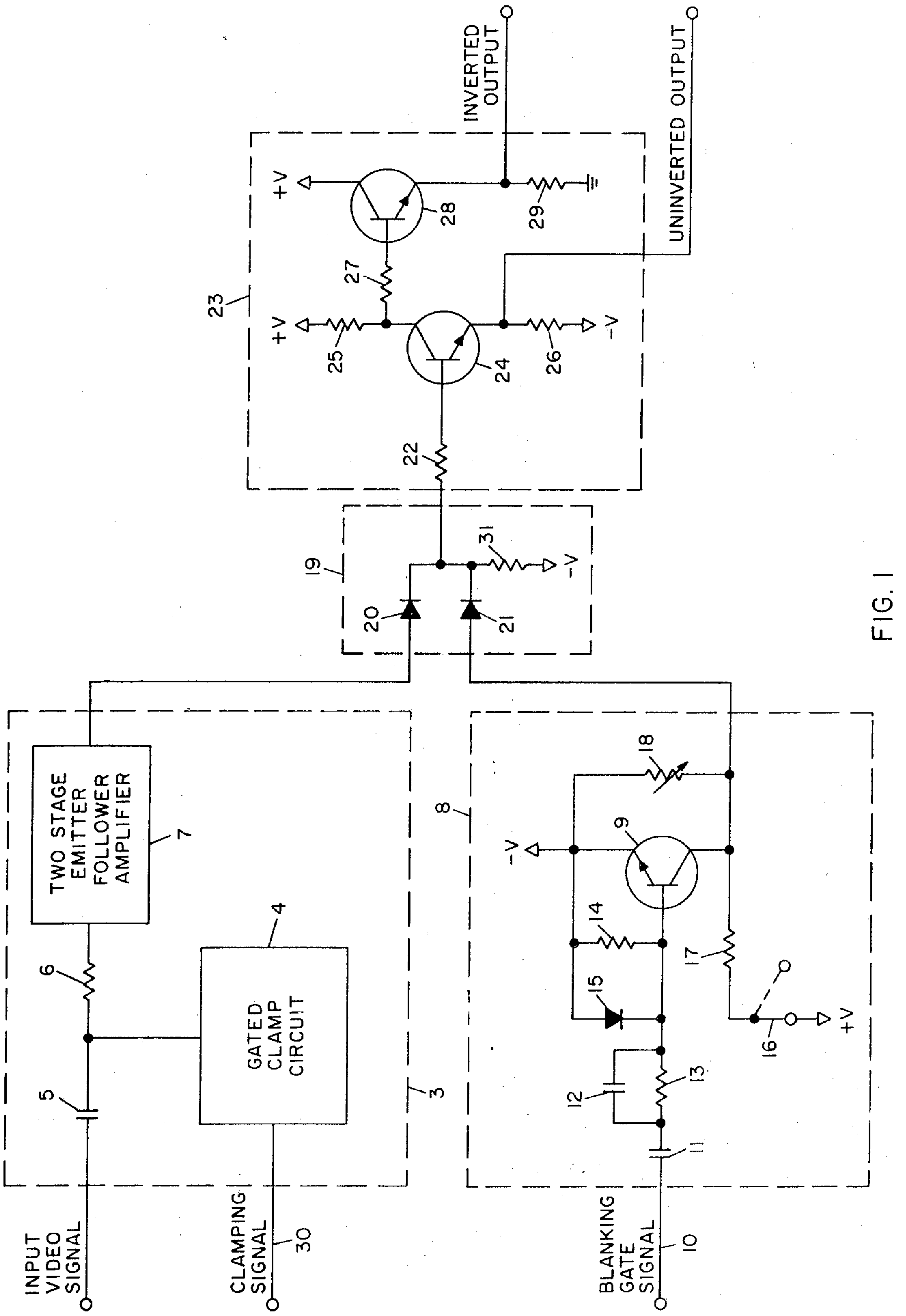
FIG. 1 is a block and schematic illustration of one embodiment of the invention.

FIG. 1 illustrates a video signal inverter constructed in accordance with the invention so as to invert only the image polarity of an image representative video input signal having alternating video and blanking components occurring during respective video and blanking intervals.

The dotted box 3 comprises means for supplying a video signal with at least a portion of each blanking component occurring at a reference level. Included in box 3 is a suitable gated clamp circuit, activated by a clamping signal supplied via lead 30 and having an output which is connected to the junction of an input capacitor 5 and a resistor 6. The remaining terminal of resistor 6 is connected to a two-stage emitter-follower amplifier 7.

Dotted box 8 comprises means for supplying a gate signal having a predetermined amplitude and occurring during at least a portion of the blanking interval. Included in box 8 is a gated transistor amplifier activated by a blanking gate signal which is supplied via lead 10 and occurs during the blanking interval. The gated transistor amplifier consists of transistor 9 which has its emitter connected to a negative supply voltage (−V) and has its base connected to the input lead 10 through capacitor 11 and the parallel combination of capacitor 12 and resistor 13. The base of transistor 9 is additionally connected to the negative supply voltage (−V) through biasing resistor 14 and clipping diode 15. The collector of transistor 9, which is utilized as the output of the gated transistor amplifier, is connected to a positive supply voltage (+V) through the series combination of switch 16 and resistor 17, and to a negative supply voltage (−V) through an adjustable resistor 18.

Dotted box 19 comprises means for combining the supplied video and gate signals to develop a composite video signal having the character of the supplied video signal during the video interval and having the character of the supplied gate signal during that portion of the blanking interval in which the supplied gate signal occurs. Included in box 19 is a "Greater Than circuit" which consists of a first diode 20 and a second diode 21 having its cathode connected to the cathode of diode 20. The anode of diode 20 is connected to the output of emitter-follower amplifier 7 and the anode of diode 21 is connected to the output of gate signal supplying means 8 (collector of transistor 9). A biasing resistor connects the common cathodes of the two diodes to a negative supply voltage.

Dotted box 23 comprises means for inverting the composite video signal from combining means 19 to develop an output video signal having a video component with inverted image polarity and having a blanking component with uninverted blanking polarity portions provided by inverted gate signals. Included in box 23 is a two-stage inverting amplifier, the first stage of which consists of transistor 24 which has its base connected to the cathodes of diodes 20 and 21 through resistor 22 and has its collector connected to a positive supply voltage through resistor 25. An uninverted video signal output lead is connected to the emitter of transistor 24 which in turn is connected to a negative supply voltage through resistor 26. The second stage of inverting amplifier 23 consists of transistor 28 whose base is connected to the collector of transistor 24 through resistor 27. The collector of transistor 28 is connected to a positive supply voltage and the emitter is connected to ground through resistor 29. An inverted video signal output lead is connected to the emitter of transistor 28.

OPERATION OF THE APPARATUS OF FIG. 1

Figures 2, 2A, 2B, 2C, 2D, 2E:
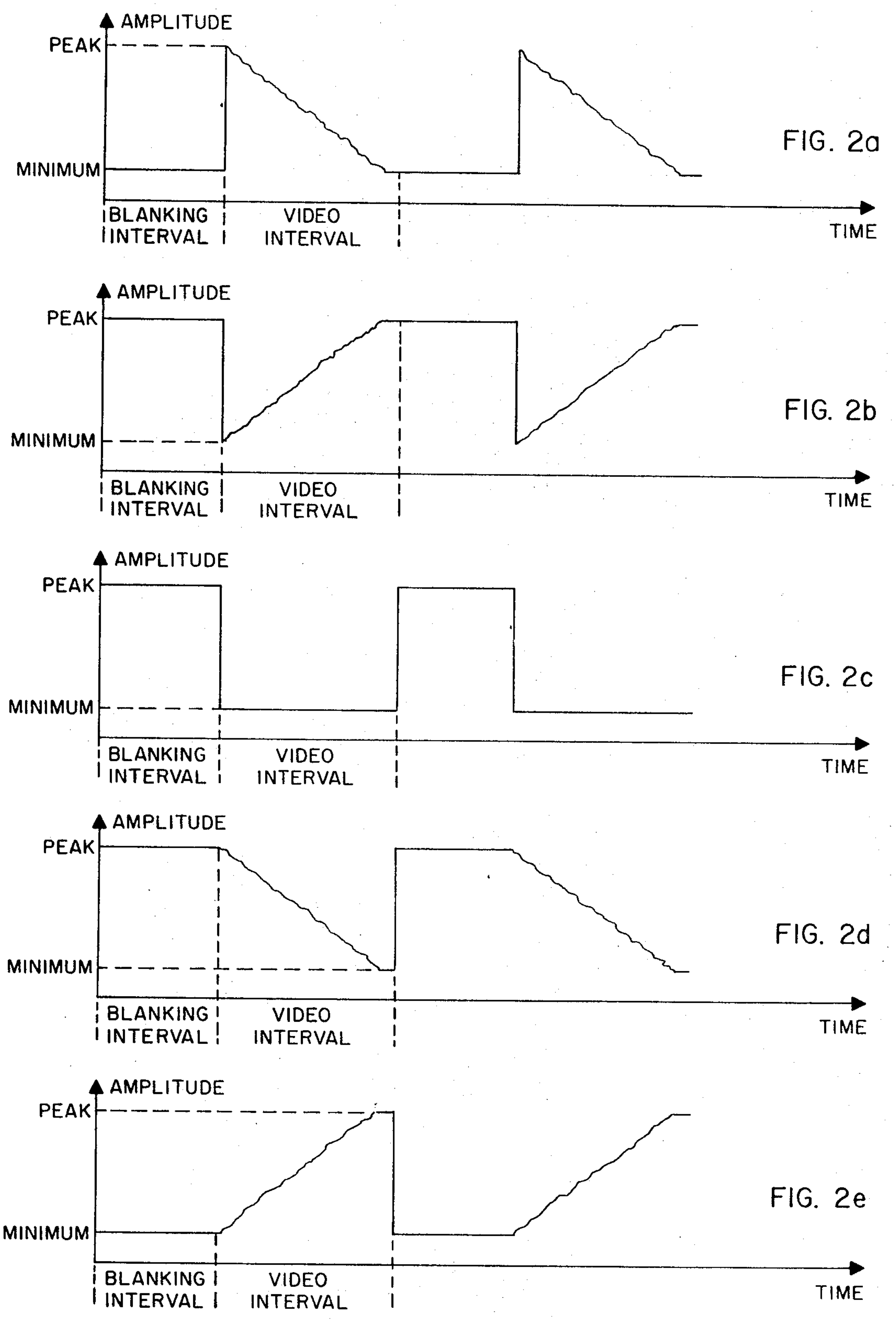
FIGS. 2*a*–2*e* are graphical illustrations of five video signal wave shapes useful in explaining the operation of the embodiment of FIG. 1.

FIG. 2*a* illustrates in graphical form a typical video signal having alternating video and blanking components occurring during respective video and blanking intervals. The video component of the signal has an amplitude which varies between a minimum and a peak value depending upon the video information contained in the original image from which the signal is derived. For purposes of illustration, the video component of FIG. 2*a* is assumed to have a peak amplitude which corresponds to white and a minimum amplitude which corresponds to black in the original image. Similarly the blanking component of the input video signal is assumed to occur at the amplitude level which corresponds to black in order to provide a fixed reference level indicative of the minimum possible value which the video component may have.

In order to facilitate understanding of the invention, FIG. 2*b* shows the video signal of FIG. 2*a* as it would appear after inversion by a conventional video signal inverter. The video component of the signal of FIG. 2*b* has the desired inverted image polarity, in that peak amplitudes of the input video signal which were representative of white have become minimum amplitudes in the inverted video signal and are now representative of black, and vice versa. However, in the video signal of FIG. 2*b* the blanking component has also been inverted and no longer represents the minimum possible value (black) of the video component. This undesirable shift in blanking component amplitude to a level other than that representative of black is herein referred to as an inversion of the blanking polarity and as previously stated is the primary object of the invention to avoid.

The input video signal of FIG. 2*a* is applied via lead 30 to capacitor 5 in the signal supplying means 3 of FIG. 1. Gated clamp circuit 4 is keyed by a suitable clamping signal which enables it to develop a clamping voltage across capacitor 5 during at least a portion of the blanking interval. The resulting clamped video signal is then amplified by the amplifier 7, which isolates the video input from the combining means of box 19.

In the gate signal supply means 8, transistor 9, which is biased in the normally ON condition, is turned off by the occurrence of a suitable blanking gate signal during each blanking interval. Clipping diode 15 ensures that the blanking gate signal applied to the base of transistor 9 will not exceed the breakdown parameters of the transistor. A voltage divider network is formed at the collector of transistor 9 between the negative supply voltage (−V), adjustable resistor 18, resistor 17 and the positive supply voltage (+V) when transistor is turned off. Thus, the turning off of transistor 9 during each blanking interval causes a pulse type signal to be formed at the collector of transistor 9. This signal illustrated in FIG. 2*c* is then supplied to the combining means 19. The amplitude of the signal is adjusted by variable resistor 18 and is preferably set to the value which is equal to the maximum possible amplitude of the supplied video signal at the output of two-stage emitter-follower amplifier 7.

Combining means 19 accepts the supplied video signal from emitter-follower amplifier 7 and the supplied gate signal from the collector of transistor 9 and combines the two signals be selecting the signal which is greater in amplitude at any given instant in time (i.e., the signal which is more positive). In this manner, as seen from graphs 2*a* and 2*c*, the resultant composite signal formed at the cathodes of diodes 20 and 21 will have the character of the supplied gate signal during the blanking interval and the character of the supplied video signal during the video interval. This composite signal, which is shown in FIG. 2*d*, is then applied to inverting means 23. While illustrated as a "Greater Than circuit", it will be recognized by those skilled in the art that any equivalent combining circuit which can produce the desired composite signal may be utilized in the box 19. By way of example, an exclusive OR circuit, having a pair of inputs for accepting the supplied video and gate signals, respectively, and having an output for providing a composite video signal with the character of the supplied video signal during the video interval and the character of the gate signal during the blanking interval, may be employed.

The composite video signal is amplified and inverted in the two-stage inverting amplifier 23 to produce the inverted output video signal shown in FIG. 2*e* at the emitter of transistor 28. This signal has an inverted image polarity, and an uninverted blanking component occurring at the minimum possible value of the video component of the signal. This value is established by the amplitude of the supplied gate signal from means 8 which was adjusted to have a value equal to or greater than the maximum possible amplitude of the supplied video signal from means 3. In addition to providing an inverted video signal output, an uninverted video signal output is available at the emitter of transistor 24 whenever switch 16 is open. Opening switch 16 causes a negative voltage to be supplied to the anode of diode 21 instead of the pulse-type signal supplied by the gate signal supplying means. If no gate signal is supplied to the combining circuit 19, the supplied video signal will pass through unaffected and appear uninverted at the emitter of transistor 24.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. Apparatus for inverting only the image polarity of an image representative video signal having alternating video and blanking components occurring during respective video and blanking intervals, comprising:

means, including a clamping circuit, for supplying said video signal with at least a portion of each blanking component occurring at a known DC reference level;

means for supplying, during at least a portion of each blanking interval, a pulse type gate signal having an amplitude adjusted to be at least as great as the maximum possible DC amplitude of said supplied video signal;

means for selecting only the signal of greater DC amplitude between said supplied video signal and said pulse type signal and for providing a composite video signal which consists of said supplied video signal during said video interval and said pulse-type signal alone during the portion of the blanking interval in which the DC amplitude of said pulse type signal is greater than the DC amplitude of the blanking component of said supplied video signal;

and means for inverting said composite video signal to develop an output video signal having a video component with inverted image polarity and having a blanking component with uninverted blanking polarity portions provided by inverted gate signals.

2. Apparatus in accordance with claim 1 wherein said inverting means comprises a two-stage transistor inverting amplifier, the first stage of which is arranged to accept said composite video signal and develop an inverted composite video signal and the second stage of which is arranged to accept said inverted composite video signal and provide said output video signal.

3. Apparatus in accordance with claim 2 wherein said gated transistor amplifier includes means for prohibiting the supplying of said pulse-type signal and for providing said combining means with a predetermined reference level to enable said combining means to continuously form a composite video signal having the character of said supplied video signal during both the video and blanking intervals;

and wherein the first stage of said two-stage transistor inverter additionally develops an uninverted output video signal in response to prohibiting of said pulse-type signal.

4. Apparatus in accordance with claim 1 wherein said means for supplying a pulse-type gate signal comprises a gated transistor amplifier which develops said adjustable amplitude gate signal during the occurrence of each of said blanking intervals.

5. Apparatus in accordance with claim 4 wherein said signal selecting means comprises a pair of diodes having one identical electrode from each diode connected together to form an output terminal upon which said composite video signal is provided, the remaining electrodes of said diode pair forming a first input for accepting said video signal and a second input for accepting said gate signal.

* * * * *